US005312662A

United States Patent [19]

Ohta et al.

[11] Patent Number: 5,312,662

[45] Date of Patent: May 17, 1994

[54] CONDUCTIVE ROLL

[75] Inventors: Yuji Ohta, Nagasaki; Masaaki Inubushi, Inuyama; Hiroyasu Kato, Bisai, all of Japan

[73] Assignee: Tokai Rubber Industries, Ltd., Japan

[21] Appl. No.: 809,147

[22] Filed: Dec. 18, 1991

[51] Int. Cl.$^5$ .................... B32B 1/08

[52] U.S. Cl. .................... 428/36.8; 428/35.8; 428/35.9; 428/36.9; 428/36.91; 428/465; 428/475.8; 428/476.1; 428/495; 430/59; 430/96; 492/49; 492/53; 492/54; 492/56

[58] Field of Search .................... 428/465, 475.8, 476.1, 428/495, 36.9, 36.91, 35.8, 35.9, 36.8; 355/211, 219; 430/59, 96; 29/895.32; 492/53, 54, 49, 56

[56] References Cited

U.S. PATENT DOCUMENTS

| | | | |
|---|---|---|---|
| 3,942,888 | 3/1976 | Maksymiak | 430/126 |
| 4,666,780 | 5/1987 | Krum | 430/96 |
| 4,807,341 | 2/1989 | Nielsen | 428/36.91 |
| 5,075,189 | 12/1991 | Ichino | 430/59 |
| 5,102,741 | 4/1992 | Miyabayashi | 428/36.9 |
| 5,103,262 | 4/1992 | Yamazaki | 355/211 |

FOREIGN PATENT DOCUMENTS

| | | |
|---|---|---|
| 6,466,676 | 3/1989 | Japan . |
| 1,142,569 | 6/1989 | Japan . |

*Primary Examiner*—Ellis P. Robinson
*Assistant Examiner*—Timothy M. Speer
*Attorney, Agent, or Firm*—Parkhurst, Wendel & Rossi

[57] ABSTRACT

An electrically conductive roll including (a) a cylindrical core body, (b) an electrically conductive, resilient layer located radially outwardly of the core body, the resilient layer containing a softening agent, (c) a preventive layer located radially outwardly of the resilient layer, the softening agent being prevented from spreading by the preventive layer, the preventive layer being formed of N-methoxymethylated nylon as a major constituent thereof, and containing an electrically conductive material, and (d) a resistance adjusting layer located radially outwardly of the preventive layer, the adjusting layer being formed of epichlorohydrin-ethylene oxide copolymer rubber as a major constituent thereof, the core body, resilient layer, preventive layer and adjusting layer constituting an integral cylindrical body. The conductive roll may further include (e) a protective layer located radially outwardly of the adjusting layer, the protective layer being formed of N-methoxymethylated nylon as a major constituent thereof. In the latter case, the core body, resilient layer, preventive layer, adjusting layer and protective layer constitute an integral cylindrical body.

22 Claims, 2 Drawing Sheets

CONDUCTIVE ROLL

BACKGROUND OF THE INVENTION

1. Field of the Invention

The present invention relates to an electrically conductive roll used in an electronic photo-copying machine, for example.

2. Related Art Statement

An electronic photo-copying machine produces a copy of an original image by forming a latent image of the original on a circumferential surface of a photosensitive drum, applying toner to the drum surface thereby forming a toner image, and transferring the toner image onto a copy sheet. For forming a latent image on the drum surface, it is required to electrically charge the drum surface in advance, and expose the charged drum surface to an original image through an optical system, thereby eliminating the electric charge from the exposed portions on the drum surface.

There have been known two types of electrical charging of the drum surface; corona charging and "contact" charging. In the corona charging method, the drum surface is charged by corona discharge produced from a corona discharging device. The corona discharging needs a high-voltage power supply (generally, 5 to 10 KV), therefore complete safety care must be taken. In addition, this charging method suffers from a disadvantage that, upon discharging, ozone is generated which is harmful to human beings. For this reason, attention has recently been directed to the contact charging method in which the drum surface is charged by frictional contact thereof with an electrically conductive roll.

FIG. 1 shows an electronic photo-copying machine employing the above-identified contact charging method. This copying machine produces a copy of an original 8, as follows: When a photosensitive drum 1 is rotated about an axis *1a* in a direction indicated at arrow in the figure, an electrically conductive roll or charging roll 2 is rotated on the outer circumferential surface of the drum 1 in the same (or reverse) direction as that of the drum 1, in such a manner that friction occurs between the drum 1 and the roll 2 with the roll 2 elastically or resiliently being deformed. Reference numeral 3 denotes an exposing device having a slit through which the original image 8 is incident to the drum surface so as to form a latent image corresponding to the original 8. Numeral 4 designates a developing device which applies toner to the latent image thereby forming a toner image. Numeral 6 denotes sheet feeding rolls which feed a copy sheet 11 toward the drum surface, and a transferring device 5 transfers the toner image onto the copy sheet 11. Numeral 7 designates fixing rolls which fix the thus reproduced image on the sheet 11 when the sheet 11 passes therethrough. Thus, a copy of the original is produced.

A cleaning device 9 serves for removing the toner residue, from the drum surface. In addition, an eraser lamp 10 irradiates the entire surface of the drum surface so that the drum surface becomes zero potential. Numeral 12 designates a power supply which applies a 1 to 3 KV electric voltage to the charging roll 2.

An electronic photo-copying machine or the like employs a lot of electrically conductive rolls (hereinafter, referred to as the "conductive rolls"), such as charging roll, developing roll, transferring roll, cleaning roll, etc. These conductive rolls are required to have an electric resistivity (i.e., specific resistance) in a range of $10^1$ to $10^{12}$ Ω·cm. As shown in FIG. 2, a conductive roll consists of a metal shaft (metal core) 21, and an electrically conductive resilient layer 22 formed on the outer circumferential surface of the core 21. Conventionally, the resilient layer 22 is formed of a mixture composition including synthetic rubber such as silicone rubber, and electrically conductive powder or fiber such as carbon black, metal powder, or carbon fiber.

Out of the above-indicated various sorts of conductive rolls, the charging roll in particular is required to have an electric resistance in a semi-conductive range of $10^5$ to $10^7$ Ω.

However, regarding the charging roll of FIG. 2, the conductivity of the resilient layer 22 is created by contact between the conductive particles dispersed in the synthetic rubber. Generally, such particle contact is not uniform in the rubber. This problem particularly occurs with respect to the above-indicated semi-conductive range. Thus, it is difficult to obtain a charging roll having a desirable electric resistance in the range of $10^5$ to $10^7$ Ω. This problem results in failing to reproduce an excellent copy of an original image.

For solving the above-identified problem, it has been proposed to provide a resistance adjusting layer 23 on the outer surface of an electrically conductive resilient layer 22 of a charging roll, as shown in FIG. 3. However, common synthetic resins (e.g., polyethylene resin, polyester resin, epoxy resin) and common synthetic rubbers (e.g., ethylene-propylene rubber, styrene-butadiene rubber, chlorinated polyethylene rubber) each are an insulating material having an electric resistivity of more than $10^{12}$ Ω.cm. In order that the resistance adjusting layer 23 is formed of one of these resins and rubbers so that the roll enjoys a suitable electric resistance of $10^5$ to $10^7$ Ω, it is required that the thickness of the adjusting layer 23 be smaller than 1 μm. However, such a thin layer 23 has no durability in service.

As is apparent from the foregoing, the conventional conductive rolls, in particular charging roll, lack resistance uniformity and serviceability, and therefore are not satisfactory.

In this situation, the inventors of the present application and another person had filed a Japanese patent application, which was laid open under Publication No. 1-142569 on Jun. 5, 1989. For overcoming the above-identified problems, we proposed to form a resistance adjusting layer of epichlorohydrin-ethylene oxide copolymer rubber (abbreviated to "CHC"). This adjusting layer enjoys uniform resistance, and sufficient adjustability to a suitable thickness for actual use or service. However, depending upon a rubber composition for the conductive resilient layer positioned under the resistance adjusting layer, a softening agent, such as oil, possibly contained in the composition may permeate, through the adjusting layer, to the outer surface of the conductive roll or charging roll. In this case, the oil may further be transferred to the outer surface of the photosensitive drum which is disposed in pressed contact with the charging roll. If the oil is spread on the drum surface, some of the toner representing an original image is adhered to the drum surface and is not transferred onto a copy sheet. Consequently, an image reproduced on the copy sheet lacks some part of the original image.

The photosensitive drum suffers from another problem that a resin film or coating provided on the drum surface is deteriorated because of permeation thereinto of the oil. Furthermore, since portions of the drum surface to which the oil is adhered cannot be electrically charged, those portions act as if they are charged and subsequently discharged by exposure to image light. In the case where discharged portions on the drum surface represent a positive image reproduced on a copy sheet, the oil-covered portions act as representing some of an image to be reproduced. It is known that, when oil is adhered to the roll surface, it often assumes a line extending in the axial direction of the roll, and consequently a black line appears as a part of a reproduced image on a copy sheet.

SUMMARY OF THE INVENTION

It is therefore a first object of the present invention to provide an electrically conductive roll which has uniform electric resistance, has a resistance adjusting layer whose thickness is adjustable to a suitable value for practical use, and is free from the problem that a softening agent such as oil bleeds or sweats on the outer surface of the adjusting layer.

The first object has been achieved according to a first aspect of the present invention, which provides an electrically conductive roll comprising (a) a cylindrical core body, (b) an electrically conductive, resilient layer located radially outwardly of the core body, the resilient layer containing a softening agent, (c) a preventive layer located radially outwardly of the resilient layer, the softening agent being prevented from spreading by the preventive layer, the preventive layer being formed of N-methoxymethylated nylon as a major constituent thereof, and containing an electrically conductive material, and (d) a resistance adjusting layer located radially outwardly of the preventive layer, the adjusting layer being formed of epichlorohydrin-ethylene oxide copolymer rubber as a major constituent thereof, the core body, the resilient layer, the preventive layer and the adjusting layer constituting an integral cylindrical body.

The conductive roll according to the first aspect of the present invention is free from all the problems as identified previously.

It is a second object of the present invention to provide an electrically conductive roll which has uniform electric resistance, has a resistance adjusting layer whose thickness is adjustable to a suitable value for practical use, is free from the problem that a softening agent such as oil bleeds or sweats on the outer surface of the adjusting layer, and is free from a problem that the roll is adhered to a photosensitive body such as a photosensitive drum used in an electronic photo-copying machine.

The second object has been achieved according to a second aspect of the present invention, which provides an electrically conductive roll comprising (a) a cylindrical core body, (b) an electrically conductive, resilient layer located radially outwardly of the core body, the resilient layer containing a softening agent, (c) a preventive layer located radially outwardly of the resilient layer, the softening agent being prevented from spreading by the preventive layer, the preventive layer being formed of N-methoxymethylated nylon as a major constituent thereof, and containing an electrically conductive material, (d) a resistance adjusting layer located radially outwardly of the preventive layer, the adjusting layer being formed of epichlorohydrin-ethylene oxide copolymer rubber as a major constituent thereof, and (e) a protective layer located radially outwardly of the adjusting layer, the protective layer being formed of N-methoxymethylated nylon as a major constituent thereof, the core body, the resilient layer, the preventive layer, the adjusting layer and the protective layer constituting an integral cylindrical body.

The conductive roll according to the second aspect of the present invention is immune to the problems as identified previously, together with a problem that, in the event that an electronic photo-copying machine is not used for a while, the roll may likely be adhered to the outer surface of a photosensitive drum used in the copying machine, resulting in even peeling a resin film off the drum surface when the copying machine is re-operated.

BRIEF DESCRIPTION OF THE DRAWINGS

The foregoing and other objects, features and advantages of the present invention will be better understood by reading the following detailed description of the preferrred embodiments of the invention when considered in conjunction with the accompanying drawings, in which.

DETAILED DESCRIPTION OF THE INVENTION

The present inventors made a series of researches for seeking the art of controlling bleeding or sweating of a softening agent, such as oil, from an electrically conductive resilient layer of an electrically conductive roll, and found that N-methoxymethylated nylon (8-nylon) is the most effective for blocking the softening agent. Our additional research revealed that, if a preventive layer formed of the N-methoxymethylated nylon and containing an electrically conductive material is interposed between the conductive resilient layer and a resistance adjusting layer of the roll, the adjusting layer exhibits its proper effect without adversely being influenced by the preventive layer. The conductive roll according to the first aspect of the present invention has been developed based on these findings.

Furthermore, we found that the N-methoxymethylated nylon is the most effective for preventing the resistance-adjusting layer from being adhered to, for example, a photosensitive drum used in an electronic photo-copying machine. If a protective layer formed of the N-methoxymethylated nylon as a major constituent thereof is disposed on the outer surface of the resistance adjusting layer of the conductive roll, the protective layer effectively protects the roll from being adhered to the photosensitive drum, thereby eliminating the problem that a resin film is peeled off the drum surface when the copying machine is re-started after the machine is not operated for a while. The conductive roll according to the second aspect of the present invention has been achieved based on these findings.

Figure 5:
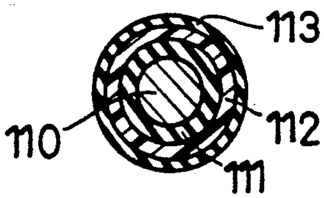
FIG. 5 is a transverse cross-sectional view of the conductive roll shown in FIG. 4.

The conductive roll according to the first aspect of the present invention is constituted by (a) a cylindrical core body, (b) an electrically conductive, resilient layer located radially outwardly of the core body, and containing a softening agent, (c) a preventive layer located radially outwardly of the resilient layer, for preventing the softening agent from spreading or permeating therethrough, the preventive layer being formed of N-methoxymethylated nylon as a major constituent thereof, and containing an electrically conductive material, and (d) a resistance adjusting layer located radially outwardly of the preventive layer, and formed of epichlorohydrin-ethylene oxide copolymer rubber as a major constituent thereof. The core body, resilient layer, preventive layer and adjusting layer constitute an integral cylindrical body as shown in FIG. 5.

Figure 7:
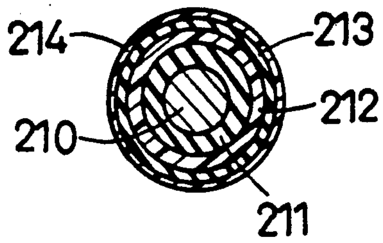
FIG. 7 is a transverse cross-sectional view of another embodiment of the electrically conductive roll according to the present invention.

The conductive roll according to the second aspect of the present invention includes, in addition to the above indicated four elements (a) through (d), a fifth element (e), i.e., protective layer located radially outwardly of the adjusting layer, and formed of N-methoxymethylated nylon as a major constituent thereof. The core body, resilient layer, preventive layer, adjusting layer and protective layer constitute an integral cylindrical body as shown in FIG. 7.

The core body is not limited to a specific one. For example, the core body may consist of either a cylindrical solid metal body, or a cylindrical hollow metal body having an axial hole formed therethrough.

The conductive resilient layer formed on the outer circumference of the core body, is not limited to a specific one. Preferably, the resilient layer is formed of a synthetic rubber selected from polynorbornene rubber, ethylene-propylene-diene rubber (EDPM), styrene-butadiene rubber, and their blends. Preferably, the resilient layer has an electric resistivity of $10^1$ to $10^4$ Ω·cm, and is formed to have a thickness of 1 to 5 mm, more preferably 2 to 4 mm.

Figure 1:
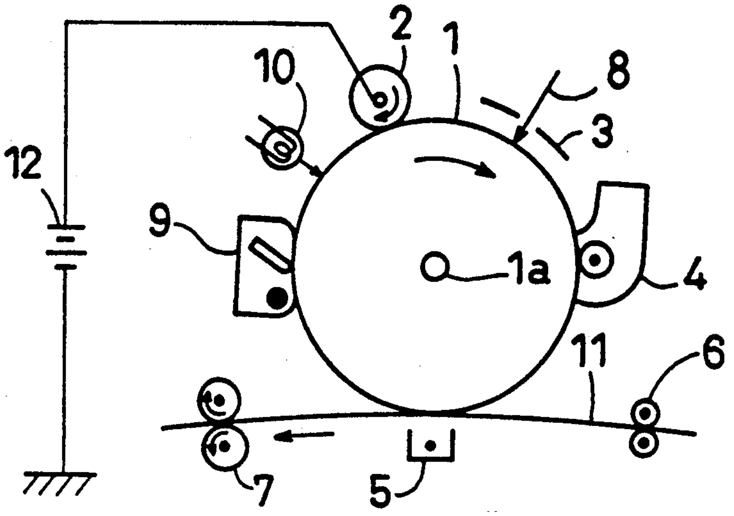
FIG. 1 PRIOR ART
FIG. 1 is an illustrative view of an electronic photo-copying machine in which an electrically conductive roll is used.
Figure 2:
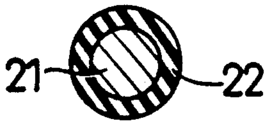
FIG. 2 PRIOR ART
FIG. 2 is a transverse cross-sectional view of a known electrically conductive roll.
Figure 3:
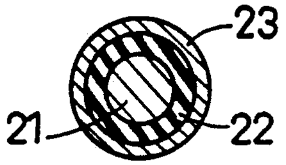
FIG. 3 PRIOR ART
FIG. 3 is a transverse cross-sectional view of another known electrically conductive roll.

In the case where the resilient layer is formed to have a hardness of not more than 25 Hs (Hs: unit of hardness defined by Japanese Industrial Standards), the conductive roll, in particular charging roll 2 as used in the machine of FIG. 1, is free from lowered copy quality (i.e., non-uniformity occurring in the transverse direction of a reproduced image) due to rare microvibration caused between the roll and the photosensitive drum, or from fogging (i.e., phenomenon that the background of a copy sheet is colored dark). The present inventors found these facts for the first time, in the research for improving the conductive roll.

Figure 6A:
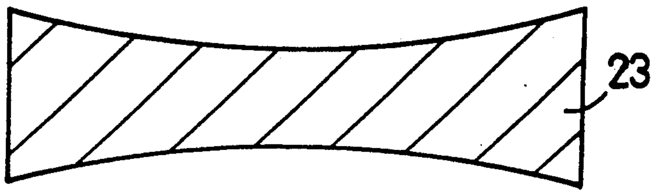
FIG. 6A PRIOR ART
FIG. 6A is a view for explaining the contact surface of the known conductive roll of FIG. 3 where the roll is in contact with a photosensitive drum.
Figure 6B:
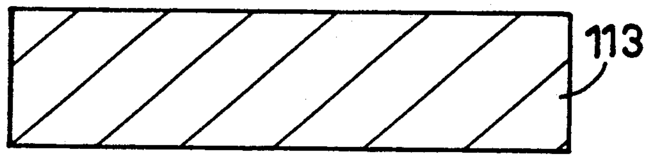
FIG. 6B is a view for explaining the contact surface of the invention conductive roll of FIG. 5 where the roll is in contact with a photosensitive drum.

Since conventional charging rolls have a relatively high hardness of about 40 Hs, those charging rolls are required to be pressed against the photosensitive drum by a considerably great force and be used in this condition. Consequently, when the prior art charging roll contacts the drum surface, the contact surface of the roll is curved or concaved as shown in FIG. 6A. However, it is desirable that a charging roll contacts drum surface in a manner that the roll maintains a plane contact surface, as shown in FIG. 6B. If the charging roll assumes the concaved contact surface as shown in FIG. 6A, the amount of electricity at the middle portion of the roll is reduced, which causes the fogging phenomenon to occur. In addition, the charging roll may resonate with the frequency of alternate current because of being pressed against the drum surface and therefore the roll may oscillate toward and away the drum surface, which deteriorates the copy quality, e.g., uniformity of a reproduced image in the transverse direction of the copy sheet. Thus, the present inventors found for the first time that the hardness of the conductive resilient layer closely relates to generation of the microvibration between the roll and the drum surface.

The present inventors made additional research on the hardness of the conductive resilient layer, and elucidated that the above-identified problems are solved by reducing, to not more than 25 Hs, the hardness of the conductive resilient layer by addition thereto of a softening agent such as oil. For example, the conductive resilient layer is formed of a rubber composition containing a rubber such as polynorbornene or a blend of polynorbornene and EPDM; an oil such as naphthenic oil; and an electrically conductive material such as carbon black (e.g., Ketjenblack available from Akzo Inc., Holland). It is preferred that the resilient layer contain 200 to 500 parts by weight (most preferably, about 400 parts by weight) of the oil per 100 parts by weight of the rubber. In addition, it is desirable that the resilient layer contain 30 to 80 parts by weight, more preferably, 40 to 60 parts by weight, of the carbon black per 100 parts by weight of the rubber. If the softening agent such as oil is used in so great an amount, the oil may bleed on the outer surface of the conductive resilient layer.

The present invention is immune to the problem caused by the oil bleeding. The N-methoxymethylated nylon-basis preventive layer formed on the outer surface of the conductive resilient layer, effectively blocks the oil bleeding from the resilient layer. It is desirable that the preventive layer have a thickness of 3 to 20 μm, more preferably 4 to 10 μm. The preventive layer may consist of the N-methoxymethylated nylon solely, except for the electrically conductive material mixed with the nylon.

Known N-methoxymethylated nylon (8-nylon) may be used for forming the preventive layer. Also, any known electrically conductive material, including Ketjenblack, may be used for the preventive layer. Generally, carbon blacks are preferable.

The resistance adjusting layer provided on the outer surface of the preventive layer, is formed of epichlorohydrin-ethylene oxide copolymer rubber (CHC) as a major constituent thereof. It is preferred that the resistance adjusting layer have a thickness of 50 to 150 μm, more preferably 60 to 100 μm.

It is the present inventors who found for the first time that the CHC rubber is the most suitable for forming the resistance adjusting layer. The CHC rubber has an electric resistivity of $10^8$ to $10^9$ Ω·cm. The CHR rubber-basis adjusting layer is free from the resistance non-uniformity problem with conventional adjusting layers which are formed of synthetic rubber and in which electrically conductive particles are dispersed.

After the present inventors made further research about the CHC rubber, they found that the electric resistivity of the CHC rubber changes depending upon the copolymerization molar ratio of epichlorohydrin to ethylene oxide. As far as the present invention is concerned, it is preferred that the CHC rubber be produced with a copolymerization molar ratio of epichlorohydrin to ethylene oxide in a range of from 65/35 to 40/60. If the proportion of ethylene oxide is lower than the lower limit, 35 mole %, the electric resistivity of the CHC rubber exceeds $10^9$ Ω·cm. In this case, if the resistance adjusting layer is formed to have the least thickness of 50 μm that meets the requirements with respect to durability and dielectric breakdown voltage, the electric resistance of the conductive roll as a whole falls in the desirable range of $10^5$ to $10^7$ Ω in normal conditions (e.g., 25° C. and 60% RH; RH=relative humidity). However, in low temperature and low humidity conditions (e.g., 10° C. and 15% RH), this resistance may exceed $10^7$ Ω. Meanwhile, if the proportion of ethylene oxide is greater than the upper limit, 60 mole %, the CHC rubber obtained suffers from too great an affinity to water and too great a dependency on environmental conditions, so that the electric resistance of the roll tends to exceed $10^7$ Ω. Therefore, it is advantageous to use CHC rubber having a copolymerization molar ratio of epichlorohydrin to ethylene oxide ranging from 65/35 to 40/60, as described above. By using this CHC rubber, it is possible to obtain a conductive roll exhibiting an electric resistance in a range of $10^5$ to $10^7$ Ω, irrespective of environmental conditions.

As a vulcanizing agent or system for producing the CHC rubber, it is possible to use any one of thiourea-metal oxide, amine, triazin, and other agents which are commonly used for vulcanizing hydrin rubber. However, it is desirable to use, as the vulcanizing system, thiourea-$Pb_3O_4$ (red lead) having high water resistance, from the standpoint of environment resistance, in particular humidity resistance. Furthermore, filler may be added. An electrically insulating filler such as silica, talc or titanium oxide may be used. Since an electrically conductive filler such as carbon black tends to cause dielectric breakdown when the conductive roll is used under high voltage, it is desirable that the proportion of the conductive filler be up to 10% by volume with respect to the CHC rubber.

According to the second aspect of the present invention, the N-methoxymethylated nylon-basis protective layer is provided on the outer surface of the resistance adjusting layer. Known N-methoxymethylated nylon may be used for the protective layer. By dispersing an electrically conductive material such as carbon black in the protective layer, the protective layer exhibits high electric conductivity even in low temperature and low humidity conditions. Thus, the conductive roll exhibits excellent performance even in low temperature and low humidity environment. It is preferred that the protective layer have a thickness of 5 to 30 μm, more preferably 7 to 23 μm. Any known conductive material may be used in place of carbon black.

The electrically conductive roll, in particular charging roll, as described above is produced in the following manner: First, an adhesive is applied to the outer surface of a cylindrical core metal body, and subsequently an electrically conductive, resilient layer is formed on the outer surface by vulcanizing the previously described rubber composition in a metal mold. Next, a liquid prepared by mixing N-methoxymethylated nylon and a conductive material, is applied by spraying or dipping to a polished outer surface of the resilient layer to coat the outer surface. The coating provided on the resilient layer is dried and, if necessary, thermally treated to produce crosslinking structure in the nylon. Thus, a preventive layer is formed. Furthermore, a resistance adjusting layer is provided on the preventive layer.

Figure 4:
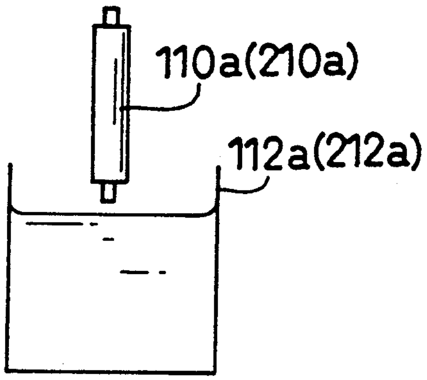
FIG. 4 is an view for explaining a manner of production of an electrically conductive roll according to the present invention.

The adjusting layer may be formed by (a) preparing an unvulcanized rubber composition by kneading CHC rubber, a reinforcing agent, a processing aid and a vulcanizing agent by a conventional rubber processing technique (e.g., by using banbury mixer, mill, etc.), (b) dissolving the composition in a suitable solvent (e.g., methyl ethyl ketone, methyl isobutyl ketone, etc.), (c) applying the liquid to the outer surface of the preventive layer and drying the applied liquid, and (d) thermally vulcanizing the liquid or composition contained therein. It is advantageous that the application of the liquid is effected by dipping the intermediate roll in the liquid. More specifically, the liquid containing the CHC rubber composition is put into a tank **112*a* as shown in FIG. 4. Then, the intermediate roll 110*a* is iteratively dipped in the solution in the tank 112*a*, in such a manner that the longitudinal axis of the roll 110*a* is held vertical. Consequently, a film of the CHC rubber is formed on the outer surface of the preventive layer. It is desirable that the viscosity of the dip liquid, rate of dipping of the intermediate roll 110*a* into the dip liquid, number of the dippings, drying time, and other conditions are so determined that the film of the CHC rubber formed has a 40 to 150 μm thickness. The intermediate roll 110*a* having the CHC rubber film is dried at 25° to 80° C. temperature for 0.5 to 4 fours, for removing the solvent from the rubber film. Subsequently, the intermediate roll 110*a* is heated at 150° to 200° C. temperature for 10 to 120 minutes so as to vulcanize the CHC rubber film and thereby provide the resistance adjusting layer. Thus, the electrically conductive roll having the laminar structure as shown in FIG. 5 is obtained. In the figure, reference numeral 110 designates the core metal body, 111 the electrically conductive resilient layer, 112 the preventive layer, and 113** the resistance adjusting layer.

For producing the electrically conductive roll according to the second aspect of the present invention, the protective layer is further formed on the intermediate roll as shown in FIG. 5. More specifically, after the outer surface of the intermediate roll is polished, as needed, either a resin liquid containing N-methoxymethylated nylon, or a mixture resin liquid containing the nylon, a conductive material and other constituents is applied by spraying or dipping to coat the outer surface, and then the coating is dried. Subsequently, the thus coated roll is thermally treated, as needed, to produce crosslinking structure in the nylon and thereby provide the protective layer. Thus, the conductive roll having the laminar structure as shown in FIG. 7 is manufactured. In the figure, reference numeral 210 designates the core metal body, 211 the electrically conductive resilient layer, 212 the preventive layer, 213 the resistance adjusting layer, and 214 the protective layer.

INVENTION EXAMPLES 1 TO 4 AND COMPARATIVE EXAMPLES 1 TO 3

Invention Examples 1, 2, 3, 4

Preparation of Composition for Conductive Resilient Layer

The conductive resilient layer of each example 1 to 4 is formed of the following rubber composition which produces a rubber having a 20 Hs hardness:

| | |
|---|---|
| Polynorbonene rubber | 100 parts by weight |

-continued

| | |
|---|---|
| Ketjenblack | 50 parts by weight |
| Naphthenic oil | 400 parts by weight |

Preparation of Composition for Preventive Layer

The preventive layer of each example is formed of a carbon black-dispersed resin liquid, the constituents thereof and their proportions being shown in TABLE I.

Preparation of Composition for Resistance Adjusting Layer

The resistance adjusting layer of each example is formed of the following rubber composition:

| | |
|---|---|
| Epichlorohydrin-ethylene oxide copolymer rubber | 100 parts by weight |
| $Pb_3O_4$ | 5 parts by weight |
| Ethylenethiourea | 1.2 parts by weight |
| Processing aid | 1 parts by weight |
| Hard clay | 40 parts by weight |

For each example 1 to 4, first, an adhesive is applied to the outer surface of a core body in the form of a metal shaft or rod having an 8 mm diameter. Subsequently, the rubber composition for the conductive resilient layer is vulcanized using a metal mold on the outer surface of the core body so that the overall diameter including the thickness of the resilient layer is 15 mm. Subsequently, the carbon-dispersed resin liquid for the preventive layer is applied by spraying to coat the outer surface of the resilient layer with a preventive layer having a 6 to 10 μm thickness. Next, the rubber composition for the resistance adjusting layer is kneaded by a mill, and then is dissolved in a solvent which is a mixture of 3 volumes of methyl ethyl ketone and 1 volume of methyl isobutyl ketone, so as to obtain a dip liquid having a viscosity of 300 cp (centipoise). Into this liquid, the above intermediate roll is dipped to coat the roll with the liquid or rubber composition. After the roll is withdrawn from the dip liquid, the roll is dried and then is thermally treated to produce crosslinking structure in the rubber composition and thereby form the adjusting layer. Thus, conductive rolls (examples) 1, 2, 3, 4 according to the present invention are obtained. The details of each example are shown in TABLE I.

Comparative Examples 1, 2, 3

Comparative Example 1

This conductive roll does not have a preventive layer. Except for this, the roll is similar to invention example 1.

Comparative Example 2

This conductive roll does not have a preventive layer. Otherwise the roll is similar to invention example 2.

Comparative Example 3

This conductive roll has an electrically conductive layer formed of the following rubber composition which produces a rubber with a hardness of 38 Hs. Otherwise the roll is similar to invention example 2.

| | |
|---|---|
| Polynorbornene | 100 parts by weight |
| Ketjenblack | 50 parts by weight |
| Naphthenic oil | 200 parts by weight |

For evaluating each of the seven, invention and comparative examples with respect to uniformity (or non-uniformity) of electrical resistance, five of 10 mm square electrodes are formed by using silver paste on the outer surface of each roll, together with guard electrodes, so as to measure an electric resistance between the metal core and each silver electrode. In addition, the electric resistances of each roll after being kept for 24 hours in various environmental conditions are measured. Dielectric breakdown voltage indicated in TABLE I is defined as a voltage at which a spark discharge occurs between the metal core and an aluminum plate on which each roll directly mounted, when the voltage applied is gradually increased in 100 V steps. Oil bleeding on the outer surface of each roll is observed by naked eyes after the roll is kept in 40° C. atmosphere for 330 hours. Metallic sound and fogging phenomenon are observed by incorporating each roll into the copying machine of FIG. 1 as the charging roll 2 thereof, and checking whether or not the charging roll produces microvibration, or counting the number of produced copies which suffer from fogging phenomenon when a hundred of copies are produced by the copying machine. The test results are shown in TABLE I.

As is apparent from the results shown in TABLE I, the invention rolls, that is, examples 1 through 4 have more excellent properties than comparative examples 1 through 3. Therefore, invention examples act as a charging roll having high performance.

TABLE I

| | INVENTION EXAMPLES | | | | COMPARATIVE EXAMPLES | | |
|---|---|---|---|---|---|---|---|
| | 1 | 2 | 3 | 4 | 1 | 2 | 3 |
| PVL | | | | | | | |
| MMN | 100 | 100 | 100 | 100 | — | — | — |
| CB | 15 | 20 | 15 | 20 | — | — | — |
| RAL | | | | | | | |
| EHR | epCG 104 | epCG | epC | epCG 102 | epCG 104 | epCG | epCG |
| MR | 65/35 | 60/40 | 50/50 | 40/60 | 65/35 | 60/40 | 60/40 |
| ERI Ω · cm | $4.6 \times 10^8$ | $3.2 \times 10^8$ | $1.8 \times 10^8$ | $1.0 \times 10^8$ | $4.6 \times 10^8$ | $3.2 \times 10^8$ | $3.2 \times 10^8$ |
| T μm | 50 | 50 | 100 | 100 | 50 | 50 | 50 |
| RESISTANCE UNIFORMITY* ERA Ω | 0.2 | 0.2 | 0.2 | 0.2 | 0.2 | 0.2 | 0.2 |

TABLE I-continued

| | INVENTION EXAMPLES | | | | COMPARATIVE EXAMPLES | | |
|---|---|---|---|---|---|---|---|
| | 1 | 2 | 3 | 4 | 1 | 2 | 3 |
| A | $2.3 \times 10^6$ | $1.7 \times 10^6$ | $1.3 \times 10^6$ | $9.2 \times 10^5$ | $2.3 \times 10^6$ | $1.7 \times 10^6$ | $1.7 \times 10^6$ |
| B | $7.6 \times 10^5$ | $5.5 \times 10^5$ | $4.6 \times 10^5$ | $2.0 \times 10^5$ | $7.6 \times 10^5$ | $5.5 \times 10^5$ | $5.5 \times 10^6$ |
| C | $9.5 \times 10^6$ | $9.1 \times 10^6$ | $7.1 \times 10^6$ | $8.3 \times 10^6$ | $9.5 \times 10^6$ | $9.1 \times 10^6$ | $9.1 \times 10^6$ |
| BREAKDOWN VOLTAGE | 2100 V | 2000 V | 3500 V | 3100 V | 2100 V | 2000 V | 2000 V |
| OIL BLEEDING | N | N | N | N | N | P | P |
| METALLIC SOUND | N | N | N | N | N | N | N |
| FOGGING | 0 | 0 | 0 | 0 | 0 | 0 | 55 sheets |

PVL: Preventive Layer
MMN: N-Methoxymethylated nylon (parts by weight)
CB: Carbon black (parts by weight)
RAL: Resistance adjusting layer
EHR: Epichlorohydrin rubber
epCG104: Epichlomer CG 104 available from Osaka Soda K.K
epCG: Epichlomer CG
epC: Epichlomer C
epCG102: Epichlomer CG102
MR: Molar ratio of epichlorohydrin to ethylene oxide
ERI: Electric resistivity measured at 25° C., 60% RH
T: Thickness of resistance adjusting layer
*: Difference between the logarithmic values (base 10) of maximum and minimum electric resistances measured with respect to the five silver elecrodes
ERA: Electric resistance
A: Electric resistance measured at 25° C., 60% RH
B: Electric resistance measured at 30° C., 85% RH
C: Electric resistance measured at 10° C., 15% RH
N: Not observed
P: Observed

INVENTION EXAMPLES 5 TO 8 AND COMPARATIVE EXAMPLES 4 TO 7

Invention Examples 5, 6, 7, 8

Preparation of compositions for the conductive resilient layer, preventive layer and resistance adjusting layer of each example 5 to 8 is similar to those for the preceding examples.

Preparation of Composition for Protective Layer

The protective layer of each example is formed of a resin liquid prepared according to TABLE II, the constituents thereof and their proportions being shown in TABLE II.

Each conductive roll is manufactured in the same manner as described for the preceding examples, except that a protective layer is formed by spraying the above resin liquid on the outer surface of the resistance adjusting layer and thereafter drying the resin. In this way, conductive rolls (examples) 5, 6, 7, 8 according to the present invention are obtained. The details of each example are shown in TABLE II.

Comparative Examples 4, 5, 6, 7

Comparative Example 4

This conductive roll does not have a preventive layer. Except for this, the roll is similar to invention example 5.

Comparative Example 5

This conductive roll does not have a preventive layer. Otherwise the roll is similar to invention example 6.

Comparative Example 6

This conductive roll does not have a preventive layer or a protective layer. Otherwise the roll is similar to invention example 5.

Comparative Example 7

This conductive roll does not have a preventive layer or a protective layer. Otherwise the roll is similar to invention example 6.

Each invention example 5-8 and each comparative example 4-7 are tested and measured with respect to uniformity of electric resistance, electric resistances in various environmental conditions, dielectric breakdown voltage, oil bleeding, metallic sound, and fogging phenomenon, in the same manners as described for the preceding invention examples 1-4 and comparative examples 1-3. In addition, whether or not each roll is adhered to a photosensitive drum is observed when the roll is incorporated into the copying machine of FIG. 1 as the charging roll 2 thereof and the machine is restarted after not being used for a predetermined time. The test results are shown in TABLE II (TABLE II-a and TABLE II-b), in which the same abbreviations as used in TABLE I represent the corresponding elements, materials and measured physical amounts.

As is understood from the results shown in TABLE II, the invention rolls 5 to 8 have more excellent properties than comparative rolls 4-7.

TABLE II-a

| | INVENTION EXAMPLES | | | | COMPARATIVE EXAMPLES | | |
|---|---|---|---|---|---|---|---|
| | 5 | 6 | 7 | 8 | 4 | 5 | 6 |
| PTL | | | | | | | |
| MMN | 100 | 100 | 100 | 100 | 100 | 100 | — |

TABLE II-a-continued

| | INVENTION EXAMPLES | | | | COMPARATIVE EXAMPLES | | |
|---|---|---|---|---|---|---|---|
| | 5 | 6 | 7 | 8 | 4 | 5 | 6 |
| CB | 8 | 8 | 8 | 8 | 8 | 8 | — |
| PVL | | | | | | | |
| MMN | 100 | 100 | 100 | 100 | — | — | — |
| CB | 15 | 20 | 15 | 20 | — | — | — |
| RAL | | | | | | | |
| EHR | epCG 104 | epCG | epC | epCG 102 | epCG 104 | epCG | epCG 104 |
| MR | 65/35 | 60/40 | 50/50 | 40/60 | 65/35 | 60/40 | 65/35 |
| ERI Ω · cm | 4.6 × $10^8$ | 3.2 × $10^8$ | 1.8 × $10^8$ | 1.0 × $10^8$ | 4.6 × $10^8$ | 3.2 × $10^8$ | 4.6 × $10^8$ |
| T μm | 50 | 50 | 100 | 100 | 50 | 50 | 50 |
| RESISTANCE UNIFORMITY* | 0.2 | 0.2 | 0.2 | 0.2 | 0.2 | 0.2 | 0.2 |
| ERA Ω | | | | | | | |
| A | 2.3 × $10^6$ | 1.7 × $10^6$ | 1.3 × $10^6$ | 9.2 × $10^5$ | 2.3 × $10^6$ | 1.7 × $10^6$ | 2.3 × $10^6$ |
| B | 7.6 × $10^5$ | 5.5 × $10^5$ | 4.6 × $10^5$ | 2.0 × $10^5$ | 7.6 × $10^5$ | 5.5 × $10^5$ | 7.6 × $10^5$ |
| C | 9.5 × $10^6$ | 9.1 × $10^6$ | 7.1 × $10^6$ | 8.3 × $10^6$ | 9.5 × $10^6$ | 9.1 × $10^6$ | 9.5 × $10^6$ |
| BREAKDOWN VOLTAGE | 2100 V | 2000 V | 3500 V | 3100 V | 2100 V | 2000 V | 2100 V |
| OIL BLEEDING | N | N | N | N | N** | N** | P |
| METALLIC SOUND | N | N | N | N | N | N | N |
| FOGGING | 0 | 0 | 0 | 0 | 0 | 0 | 0 |
| ADHESION | N | N | N | N | N | N | P |

PTL: Protective layer
N**: Oil bleeding was not observed, but denaturing of the resistance adjusting layer was observed.

TABLE II-b

| | COMPARATIVE EXAMPLES 7 |
|---|---|
| PTL | |
| MMN | — |
| CB | — |
| PVL | |
| MMN | — |
| CB | — |
| RAL | |
| EHR | epCG |
| MR | 60/40 |
| ERI Ω · cm | 3.2 × $10^8$ |
| T μm | 50 |
| RESISTANCE UNIFORMITY* | 0.2 |
| ERA Ω | |
| A | 1.7 × $10^6$ |
| B | 5.5 × $10^5$ |
| C | 9.1 × $10^6$ |
| BREAKDOWN VOLTAGE | 2000 V |
| OIL BLEEDING | P |
| METALLIC SOUND | N |
| FOGGING | 0 |
| ADHESION | P |

As emerges from the foregoing description, the electrically conductive roll according to the first aspect of the present invention includes a resistance adjusting layer formed of epichlorohydrin-ethylene oxide copolymer rubber as a major constituent thereof, the adjusting layer being provided on the outer surface of the electrically conductive resilient layer formed on the outer surface of a cylindrical core body. The adjusting layer has generally uniform electric resistance throughout itself. In addition, the adjusting layer is adjustable to a considerably large thickness suitable for actual use. Also, the invention conductive roll includes, between the resilient layer and the adjusting layer, a softening agent spread preventive layer formed of N-methoxymethylated nylon as a major constituent thereof and containing an electrically conductive material. The preventive layer blocks the softening agent, such as oil, bleeding from the resilient layer and thereby prevents the oil from spreading to the adjusting layer. Therefore, the invention conductive roll is free from the problem that softening agent such as oil bleeds or sweats on the outer surface of the roll. Consequently, the invention roll is immune to "white spot" possibly occurring on a reproduced image due to the oil bleeding, and additionally to deterioration of a resin film or coating provided on the outer surface of a photosensitive drum due to penetration thereinto of the oil.

Furthermore, according to the second aspect of the present invention, the conductive roll further includes a protective layer formed of N-methoxymethylated nylon as a major constituent thereof, the protective layer being formed on the outer surface of the resistance adjusting layer. This conductive roll solves the problem that, in the case where the roll is used as a charging roll for an electronic photo-copying machine, the adjusting layer is adhered to a photosensitive drum of the copying machine while the machine is not operated. That is, this roll effectively protects the resin film provided on the outer surface of the drum from being broken due to the adhesion of the roll to the drum when the machine is re-started after not being used for a while.

It is to be understood that the present invention may be embodied with various changes and improvements that may occur to those skilled in the art without departing from the scope and spirit of the present invention.

What is claimed is:

1. An electrically conductive roll comprising:

a cylindrical core body;

an electrically conductive, resilient layer located radially outwardly of said core body, said resilient layer containing a softening agent;

a preventive layer located radially outwardly of said resilient layer, said softening agent being prevented from spreading by said preventive layer, said preventive layer being formed of N-methoxymethylated nylon as a major constituent thereof, and containing an electrically conductive material; and a resistance adjusting layer located radially outwardly of said preventive layer, said adjusting layer being formed of epichlorohydrin-ethylene oxide copolymer rubber as a major constitutent thereof and having an electric resistance of $10^8$ to $10^9$ Ω·cm, said core body, said resilient layer, said preventive layer and said adjusting layer constituting an integral cylindrical body.

2. The conductive roll as set forth in claim 1, wherein said core body comprises a cylindrical solid metal body.

3. The conductive roll as set forth in claim 1, wherein said core body comprises a cylindrical hollow metal body.

4. The conductive roll as set forth in claim 1, wherein said resilient layer has a thickness of 1 to 5 mm.

5. The conductive roll as set forth in claim 1, wherein said resilient layer has an electric resistivity of $10^1$ to $10^4$ Ω·cm.

6. The conductive roll as set forth in claim 1, wherein said resilient layer is formed of a synthetic rubber selected from the group consisting of polynorbornene rubber, ethylene-propylene-diene rubber, styrene-butadiene rubber, and their blends.

7. The conductive roll as set forth in claim 6, wherein said softening material contained in said resilient layer comprises an oil.

8. The conductive roll as set forth in claim 7, wherein said resilient layer contains 200 to 500 parts by weight of said oil per 100 parts by weight of said rubber.

9. The conductive roll as set forth in claim 7, wherein said oil comprises naphthenic oil.

10. The conductive roll as set forth in claim 6, wherein said resilient layer contains an electrically conductive material.

11. The conductive roll as set forth in claim 10, wherein said electrically conductive material contained in said resilient layer ranges from 30 to 80 parts by weight per 100 parts by weight of said rubber.

12. The conductive roll as set forth in claim 10, wherein said electrically conductive material comprises carbon black.

13. The conductive roll as set forth in claim 1, wherein said preventive layer has a thickness of 3 to 20 μm.

14. The conductive roll as set forth in claim 1, wherein said preventive layer consists of said N-methoxymethylated nylon and said conductive material.

15. The conductive roll as set forth in claim 1, wherein said electrically conductive material contained in said preventive layer comprises carbon black.

16. The conductive roll as set forth in claim 1, wherein said resistance adjusting layer has a thickness of 50 to 150 μm.

17. The conductive roll as set forth in claim 1, wherein said epichlorohydrin-ethylene oxide copolymer rubber contained in said resistance adjusting layer has a copolymerization molar ratio of epichlorohydrin to ethylene oxide ranging from 65/35 to 40/60.

18. The conductive roll as set forth in claim 1, having an electric resistance of $10^5$ to $10^7$ Ω.

19. An electrically conductive roll comprising:

a cylindrical core body;

an electrically conductive, resilient layer located radially outwardly of said core body, said resilient layer containing a softening agent;

a preventive layer located radially outwardly of said resilient layer, said softening agent being prevented from spreading by said preventive layer, said preventive layer being formed of N-methoxymethylated nylon as a major constituent thereof, and containing an electrically conductive material;

a resistance adjusting layer located radially outwardly of said preventive layer, said adjusting layer being formed of epichlorohydrin-ethylene oxide copolymer rubber as a major constituent thereof and having an electric resistivity of $10^8$ to $10^9$ Ω·cm; and a protective layer located radially outwardly of said adjusting layer, said protective layer being formed of N-methoxymethylated nylon as a major constituent thereof, said core body, said resilient layer, said preventive layer, said adjusting layer and said protective layer constituting an integral cylindrical body.

20. The conductive roll as set forth in claim 19, wherein said protective layer contains an electrically conductive material such as carbon black.

21. The conductive roll as set forth in claim 20, wherein said protective layer has a thickness of 5 to 30 μm.

22. The conductive roll as set forth in claim 20, having an electric resistance of $10^5$ to $10^7$ Ω.

* * * * *